US012280476B2

(12) United States Patent
Liaw

(10) Patent No.: US 12,280,476 B2
(45) Date of Patent: Apr. 22, 2025

(54) PNEUMATIC EXTRACTION DEVICE

(71) Applicant: Jian-Shiou Liaw, Taichung (TW)

(72) Inventor: Jian-Shiou Liaw, Taichung (TW)

( * ) Notice: Subject to any disclaimer, the term of this patent is extended or adjusted under 35 U.S.C. 154(b) by 253 days.

(21) Appl. No.: 18/150,022

(22) Filed: Jan. 4, 2023

(65) Prior Publication Data

US 2024/0217079 A1 Jul. 4, 2024

(51) Int. Cl.
*B25B 27/00* (2006.01)
*B25B 27/02* (2006.01)

(52) U.S. Cl.
CPC .................................. *B25B 27/026* (2013.01)

(58) Field of Classification Search
CPC ........ B25B 27/026; B25B 27/00; B25B 27/14
See application file for complete search history.

(56) References Cited

U.S. PATENT DOCUMENTS 2,730,073 A 1/1956 Leavell
6,443,675 B1 9/2002 Kopras et al.
10,179,400 B2 * 1/2019 Furusawa ............... B25F 5/026
2020/0230795 A1 * 7/2020 Carlson ................... B25C 1/047
2021/0387318 A1 12/2021 Ueda
2022/0388138 A1 12/2022 Hale et al.
2024/0217079 A1 * 7/2024 Liaw ..................... B25B 27/026
2024/0351180 A1 * 10/2024 Eardley ................. F01C 21/006

FOREIGN PATENT DOCUMENTS

CN 211863498 U 11/2020
EP 1125698 A2 8/2001
FR 2152482 A1 4/1973
IT RM20150199 A1 11/2016
TW I647077 B 1/2019

* cited by examiner

*Primary Examiner* — Lee D Wilson
(74) *Attorney, Agent, or Firm* — RABIN & BERDO, P.C.

(57) ABSTRACT

A pneumatic extraction device has a holding group, an air intake group, and a vibration group. The holding group has a handle and an outer shell. The handle has at least one connecting arm formed on and protruded from the handle. The outer shell is connected to the at least one connecting arm opposite to the handle such that the outer shell and the handle are spaced apart from each other. The air intake group is connected to the holding group and has a connecting sleeve connected to the handle. The vibration group is connected to the holding group and the air intake group and has a main shaft and a vibrating cylinder. The main shaft is connected to the connecting sleeve. The vibrating cylinder is slidably mounted on the main shaft and has an outer external surface non-contacted with an internal surface of the outer shell.

12 Claims, 11 Drawing Sheets

PNEUMATIC EXTRACTION DEVICE

BACKGROUND OF THE INVENTION

1. Field of the Invention

The present invention relates to a pneumatic extraction device, and more particularly to a pneumatic extraction device that can be held easily, can reduce operating time, and can improve safety.

2. Description of Related Art

A conventional diesel engine comprises multiple fuel injectors to provide oil and gas, so that the conventional diesel engine can provide power output after combustion operation. However, the fuel injectors are prone to accumulation or blockage due to impurities or oil collision after a long time use, and this will affect the atomization effect of oil and gas. At this time, the fuel injectors are needed to be taken out from the conventional diesel engine for cleaning or replacement. Since the fuel injectors are tightly fitted on a cylinder of the conventional diesel engine, and the fuel injectors cannot be easily removed manually. With reference to FIG. 11, a conventional pneumatic extraction device 50 can be used to remove the fuel injectors from the conventional diesel engine. The conventional pneumatic extraction device 50 has a vibrator 51, an air delivery pipe 52, and a switch 53. A bottom of the vibrator 51 is connected to one of the fuel injectors of the conventional diesel engine, the air delivery pipe 52 is connected to the vibrator 51 to transmit compressed air into the vibrator 51, and the switch 53 is disposed on the air delivery pipe 52 to control the transmission of the compressed air.

When the conventional pneumatic extraction device 50 is in use, the vibrator 51 is securely connected to one of the fuel injectors, and the switch 53 is open to enable the compressed air to flow into the vibrator 51 via the air delivery pipe 52. Then the corresponding fuel injector can be gradually removed from the cylinder after the vibration of the vibrator 51. Although the corresponding fuel injector can be removed from the cylinder by the conventional pneumatic extraction device 50, the user will not hold the vibrator 51 during the vibrating process of the conventional pneumatic extraction device 50 to avoid being affected by the vibration of the vibrator 50 since the corresponding fuel injector is only connected to the bottom of the vibrator 51. Therefore, the user needs to observe the movement of the corresponding fuel injector relative to the cylinder during use to avoid safety concerns caused by the corresponding fuel injector flying outward together with the vibrator 51 when the corresponding fuel injector is separated from the cylinder. Generally, when the corresponding fuel injector is about to separate away from the cylinder, the switch 53 is closed to stop the vibrator 51 from vibrating, and then the vibrator 51 is separated from the corresponding fuel injector. After the vibrator 51 is separated from the corresponding fuel injector, the corresponding fuel injector is manually pulled out from the cylinder, so as to avoid the random flying of the corresponding fuel injector along with the vibrator 51.

Although the conventional pneumatic extraction device 50 can be used to pull the fuel injectors from the cylinder, the user needs to remove the fuel injector from the cylinder by two-stage operation, and this is relatively inconvenient and time-consuming. Furthermore, the user needs to pay attention to the movement of the fuel injector during the operation, and industrial safety hazard will still occur when the user does not pay attention. Therefore, the conventional pneumatic extraction device 50 really has to be improved.

To overcome the shortcomings, the present invention tends to provide a pneumatic extraction device, to mitigate or obviate the aforementioned problems.

SUMMARY OF THE INVENTION

The main objective of the present invention is to provide a pneumatic extraction device that can be held easily, can reduce operating time, and can improve safety.

The pneumatic extraction device in accordance with the present invention has a holding group, an air intake group, and a vibration group. The holding group has a handle and an outer shell. The handle has at least one connecting arm formed on and protruded from an external surface of the handle. The outer shell is connected to the at least one connecting arm opposite to the handle such that the outer shell and the handle are spaced apart from each other. The air intake group is connected to the holding group and has a connecting sleeve connected to the handle. The vibration group is connected to the holding group and the air intake group and has a main shaft and a vibrating cylinder. The main shaft is connected to the connecting sleeve and is opposite to the handle, extends into the outer shell, and has a fixing head disposed on a bottom end of the main shaft. The vibrating cylinder is slidably mounted around the main shaft, is mounted in the outer shell, and has an outer external surface non-contacted with an internal surface of the outer shell.

Other objects, advantages and novel features of the invention will become more apparent from the following detailed description when taken in conjunction with the accompanying drawings.

DETAILED DESCRIPTION OF THE PREFERRED EMBODIMENT

Figure 1:
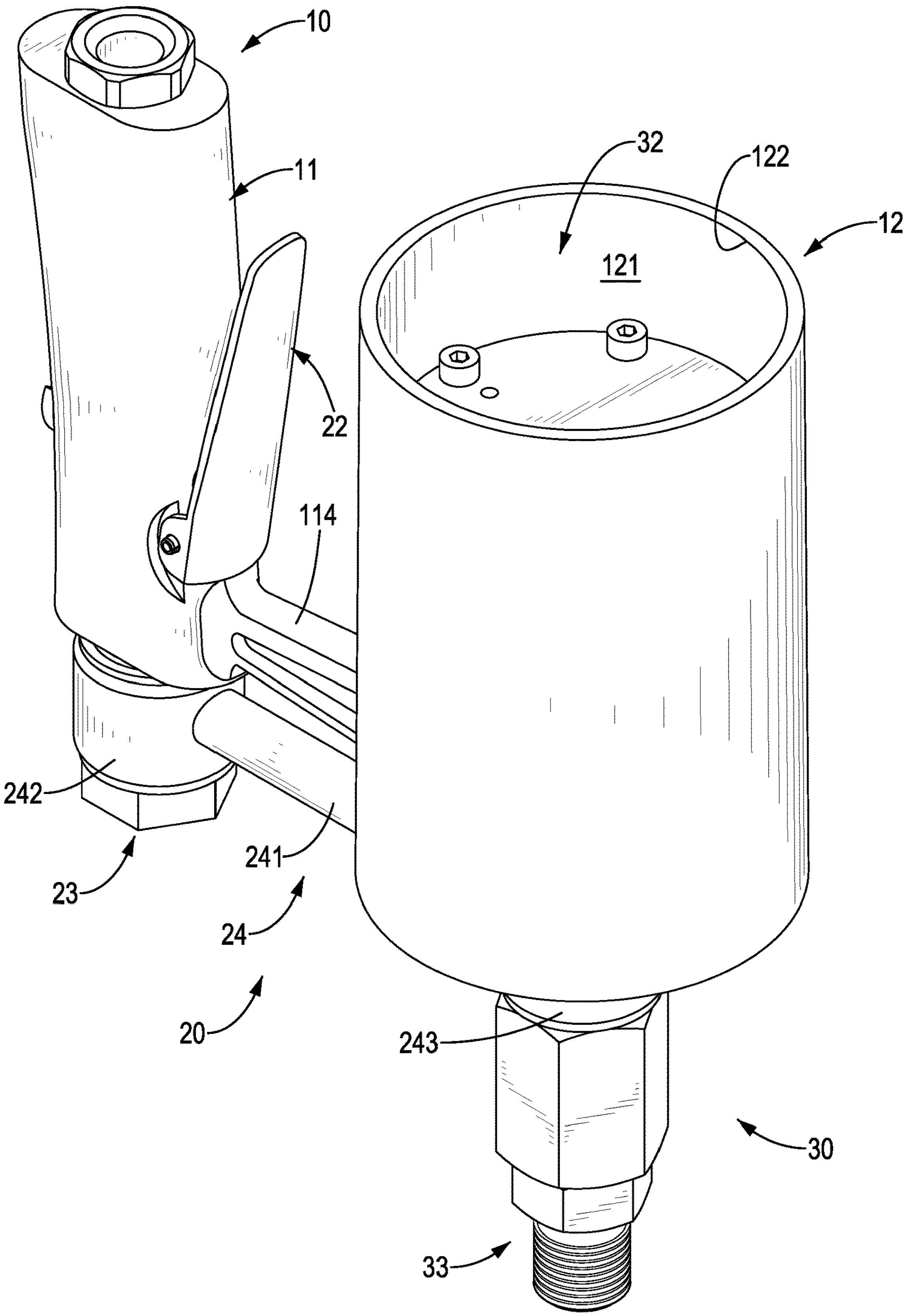
FIG. 1 is a perspective view of a pneumatic extraction device in accordance with the present invention.

With reference to FIGS. 1 to 4, a pneumatic extraction device in accordance with the present invention has a holding group 10, an air intake group 20, and a vibration group 30.

The holding group 10 has a handle 11 and an outer shell 12. The handle 11 has an air inlet 111, a mounting recess 112, an air outlet 113, and at least one connecting arm 114. The air inlet 111 is longitudinally formed in the handle 11 from a top of the handle 11. The mounting recess 112 is transversally formed in a middle portion of the handle 11 and communicates with the air inlet 111. The air outlet 113 is formed in a bottom of the handle 11 and communicates with the mounting recess 112. The at least one connecting arm 114 is transversally formed on and protrudes from an external surface of the handle 11 adjacent to the bottom of the handle 11. The outer shell 12 is connected to an end of the at least one connecting arm 114 opposite to the handle 11 such that the outer shell 12 and the handle 11 are spaced apart from each other. Preferably, the handle 11, the at least one connecting arm 114, and the outer shell 12 are formed as a single piece. The outer shell 12 is a hollow casing and has a mounting chamber 121, an upper opening 122, and a lower opening 123. The mounting chamber 121 is formed in the outer shell 12. The upper opening 122 and the lower opening 123 are respectively formed on a top and a bottom of the outer shell 12 and both communicate with the mounting chamber 121.

The air intake group 20 is connected to the holding group 10 and has a valve base 21, a trigger 22, a connecting head 23, and a connecting sleeve 24. The valve base 21 is mounted in the mounting recess 112 of the handle 11 to enable the air inlet 11 to selectively communicate with the air outlet 113. The trigger 22 is pressingly connected to the valve base 21 on the external surface of the handle 11. The air inlet 111 communicates with the air outlet 113 via the mounting recess 112 when the trigger 22 is pressed by a user. Preferably, the trigger 22 is disposed on the external surface of the handle 11 that faces to the outer shell 12 and is disposed above the at least one connecting arm 114. In addition, the valve base 21 and the trigger 22 are conventional and the features and the structures of the valve base 21 and the trigger 22 are not to be described in detail. The connecting head 23 is connected to the bottom of the handle 11 and communicates with the air outlet 113. The connecting sleeve 24 is connected to the connecting head 23 and has a vent pipe 241 and two mounting rings 242, 243. The two mounting rings 242, 243 are respectively disposed on two ends of the vent pipe 241, and one of the two mounting rings 242, 243 is mounted around the connecting head 23 and communicates with the connecting head 23. Preferably, the two mounting rings 242, 243 are respectively a first mounting ring 242 and a second mounting ring 243. The first mounting ring 242 is mounted around the connecting head 23.

Figure 4:
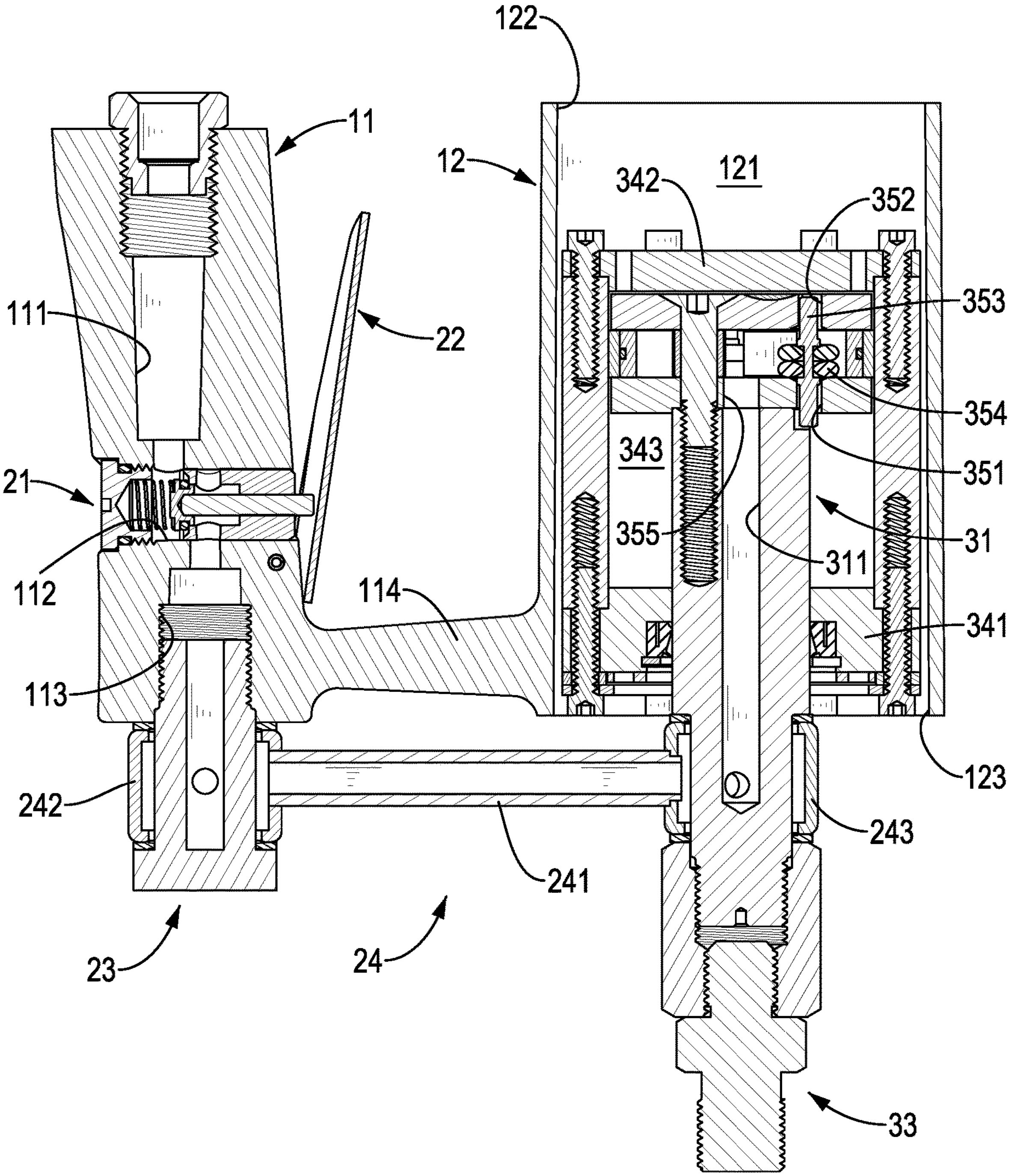
FIG. 4 is a side view of the pneumatic extraction device along line 4-4 in FIG. 3.
Figure 5:
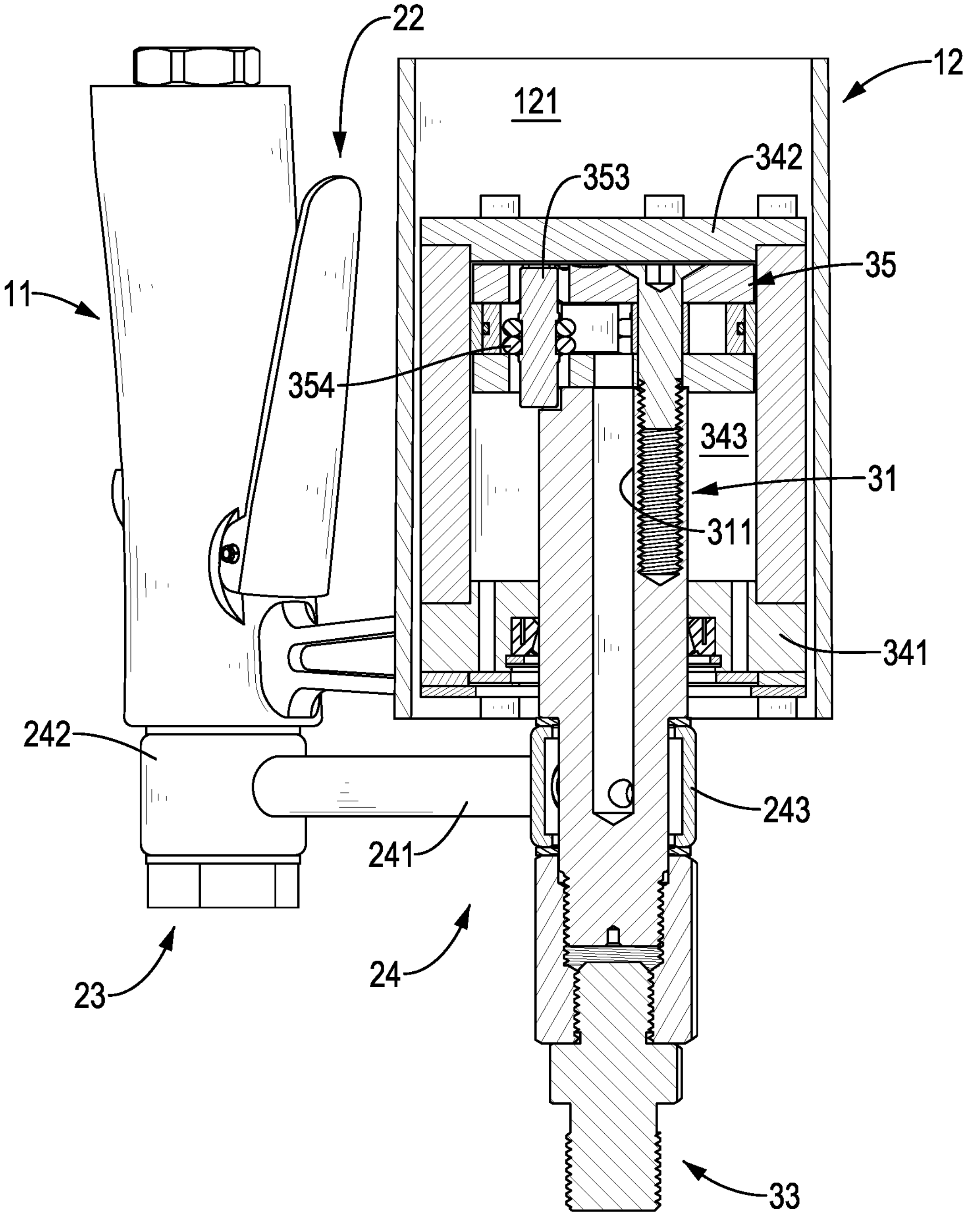
FIG. 5 is a side view of the pneumatic extraction device along line 5-5 in FIG. 3.
Figure 6:
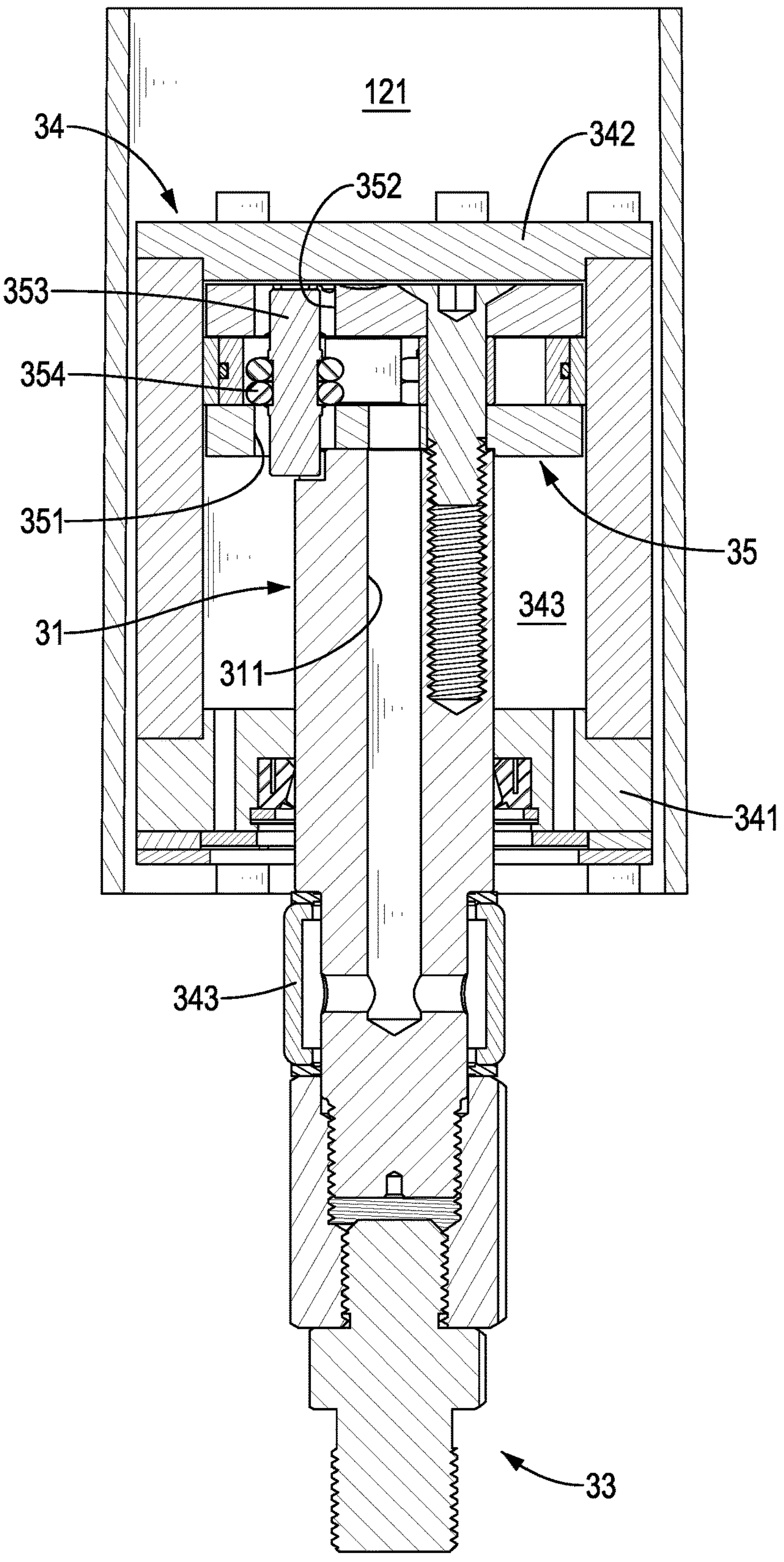
FIG. 6 is a side view of the pneumatic extraction device along line 6-6 in FIG. 3.

With reference to FIGS. 4 to 6, the vibration group 30 is connected to the holding group 10 and the air intake group 20 and has a main shaft 31 and a vibrating cylinder 32. The main shaft 31 is connected to one of the two mounting rings 242, 243 of the connecting sleeve 24 that is opposite to the connecting head 23. Preferably, the second mounting ring 243 of the connecting sleeve 24 is mounted around the main shaft 31. In addition, the connecting sleeve 24 has an anti-leak washer 244 disposed in a top side and a bottom side of each one of the two mounting rings 242, 243. The main shaft 31 has a top end, a bottom end, a fixing head 33, and an air passage 311. The top end of the main shaft 31 extends into the mounting chamber 121 of the outer shell 12 via the lower opening 123. The fixing head 33 is disposed on the bottom end of the main shaft 31 and can be connected to a fuel injector of a diesel engine. The air passage 311 is axially formed in the main shaft 31 from the top end of the main shaft 31 and communicates with the second mounting ring 243.

The vibrating cylinder 32 is slidably mounted around the main shaft 31, is mounted in the mounting chamber 12 of the outer shell 12 and has an outer external surface non-contacted with an internal surface of the outer shell 12 such that the vibrating cylinder 32 is spaced apart from the outer shell 12. When the vibrating cylinder 32 is moved relative to the main shaft 31, the vibrating cylinder 32 will not rub against the outer shell 12. The vibrating cylinder 32 has an outer jacket 34 and a ventilating seat 35. The outer jacket 34 is slidably mounted around the main shaft 31 and has a bottom mount 341, a top cover 342, and an air chamber 343. The bottom mount 341 is disposed on a bottom of the outer jacket 34, is slidably mounted around the main shaft 31, and is disposed above the second mounting ring 243. The top cover 342 is disposed on a top of the outer jacket 34. The air chamber 343 is formed in the outer jacket 34 between the bottom mount 341 and the top cover 342. The ventilating seat 35 is mounted securely on the top end of the main shaft 31 and is disposed in the air chamber 343 between the bottom mount 341 and the top cover 342. The ventilating seat 35 allows the compressed air in the air passage 311 of the main shaft 31 to flow between the ventilating seat 35 and the top cover 342 and between the ventilating seat 35 and the bottom mount 341, so that the outer jacket 34 can move relative to the main shaft 31 and the ventilating seat 35 in the mounting chamber 121 of the outer shell 12, thereby providing a vibrating force for the main shaft 31.

Figure 2:
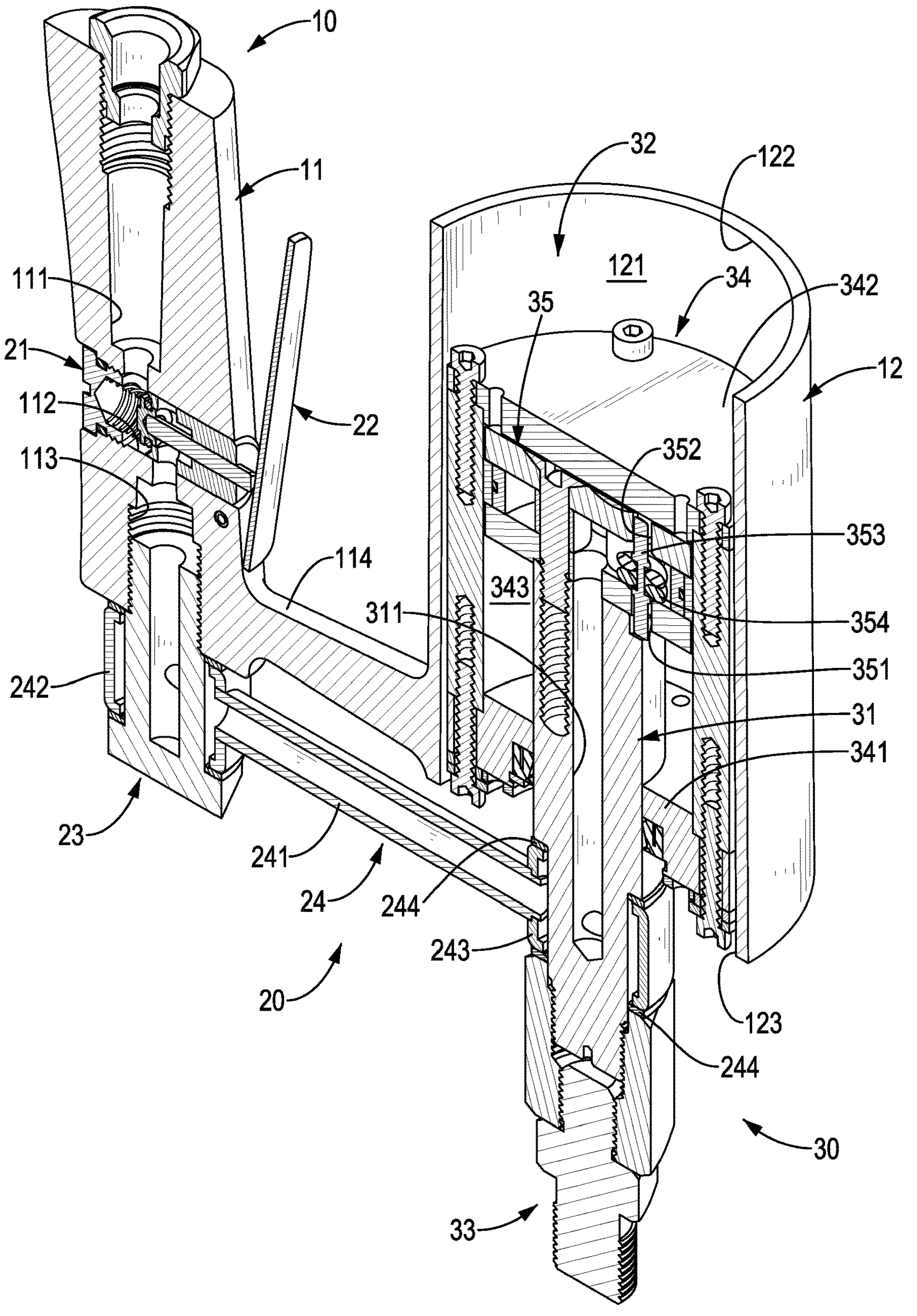
FIG. 2 is perspective and sectional view of the pneumatic extraction device in FIG. 1.
Figure 3:
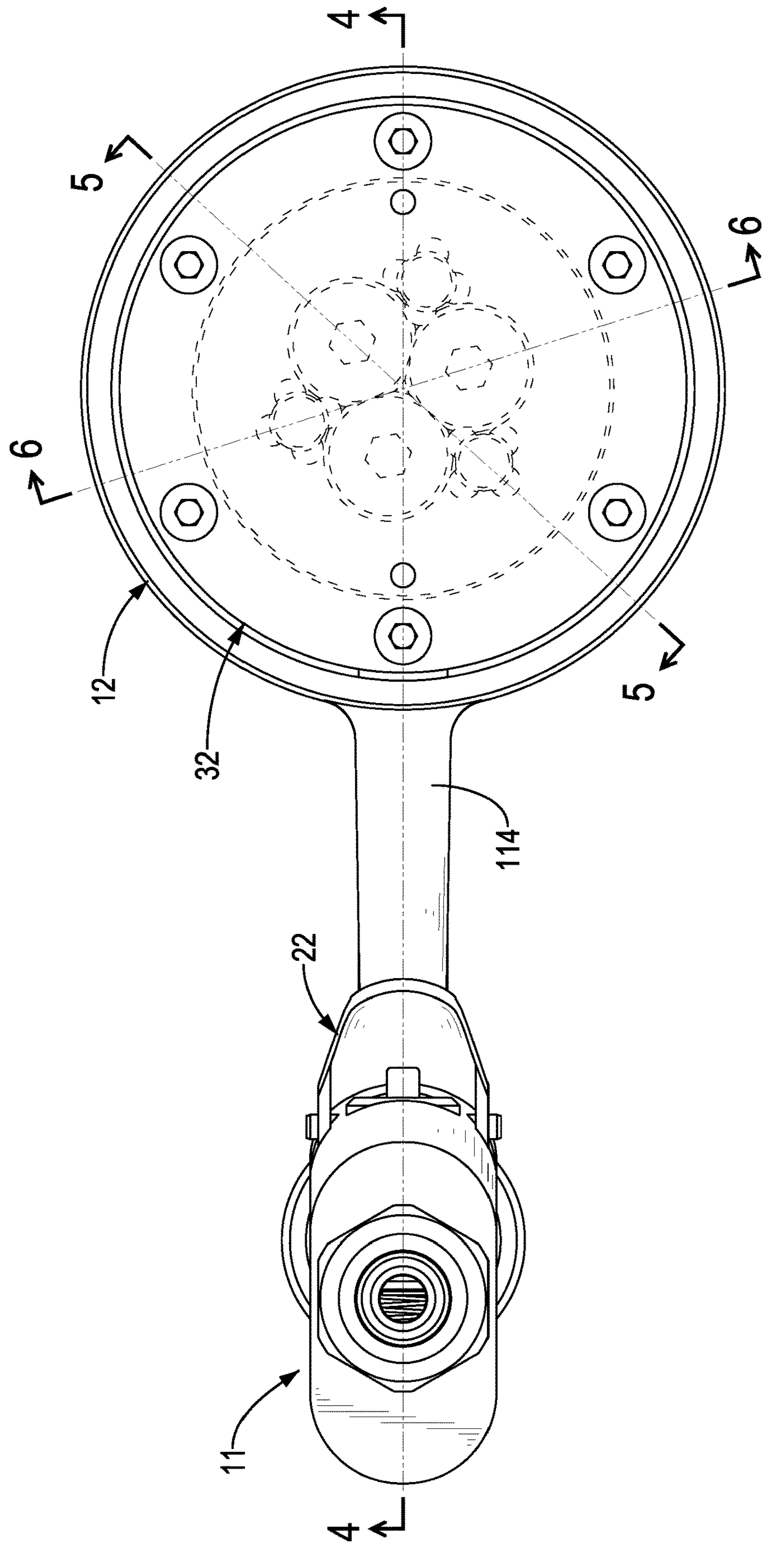
FIG. 3 is a top side view of the pneumatic extraction device in FIG. 1.

Furthermore, with reference to FIGS. 2, 3, and 5, the ventilating seat 35 has multiple lower through holes 351, multiple upper through holes 352, multiple toggle levers 353, and a communicating hole 355. The lower through holes 351 are formed through a bottom of the ventilating seat 35 at spaced intervals and surrounding the air passage 311 of the main shaft 31. The upper through holes 352 are formed through a top of the ventilating seat 35 at spaced intervals, respectively align with the lower through holes 351, and communicate with the air chamber 343 of the outer jacket 34. The toggle levers 353 are movably disposed in the ventilating seat 35, and each one of the toggle levers 353 is mounted in one of the lower through holes 351 and a corresponding one of the upper through holes 352. Each toggle lever 353 has at least one washer 354 mounted around the toggle lever 353 and selectively shielding the corresponding lower through hole 351 and the corresponding upper through hole 352. Preferably, the ventilating seat 35 has three said lower through holes 351, three said upper through holes 352, and three said toggle levers 353. The communicating hole 355 is formed through a center of the bottom of the ventilating seat 35 and communicates with the air passage 311 of the main shaft 31.

Figure 7:
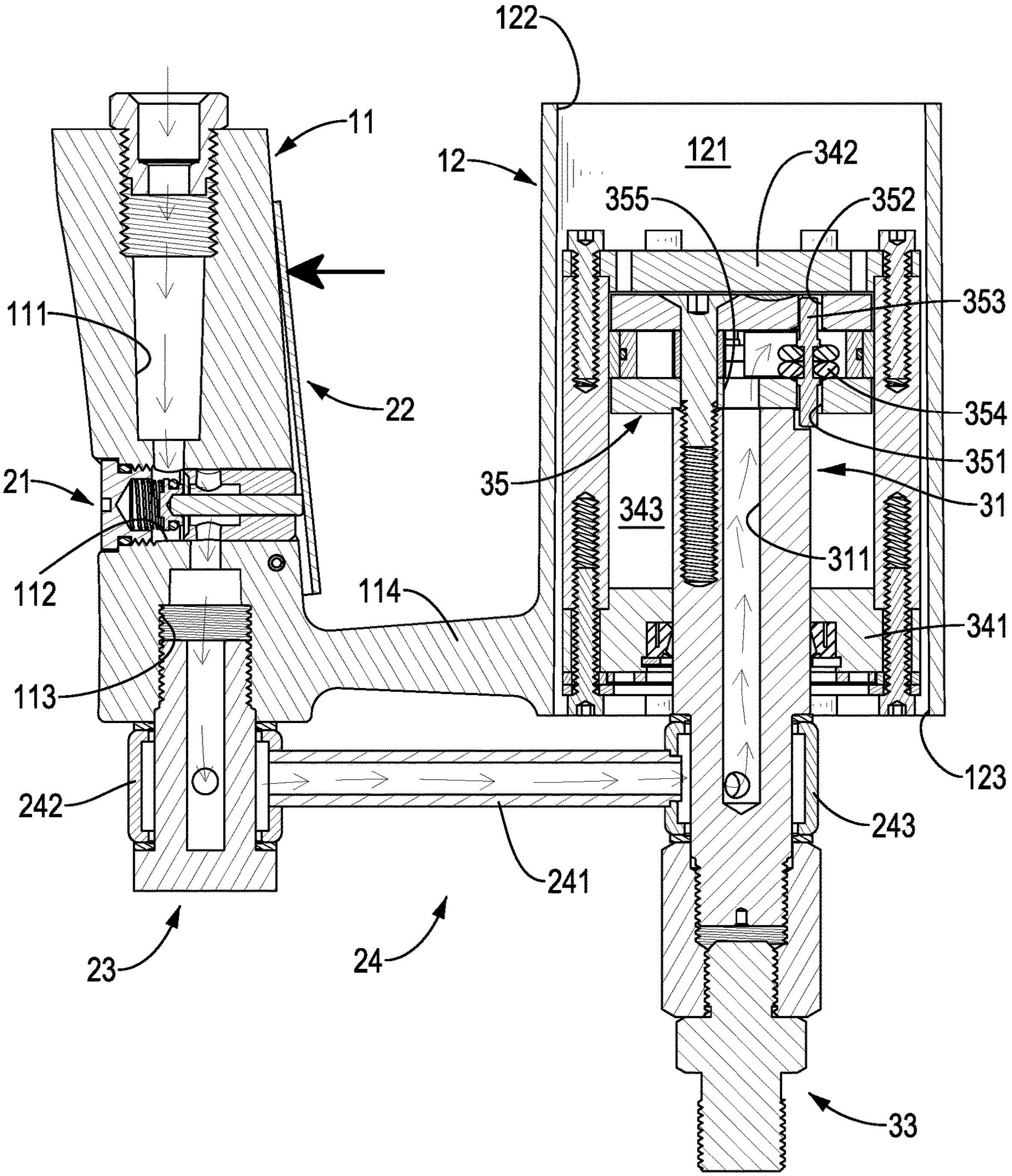
FIGS. 7 to 10 are operational side views of the pneumatic extraction device in FIG. 1.
Figure 8:
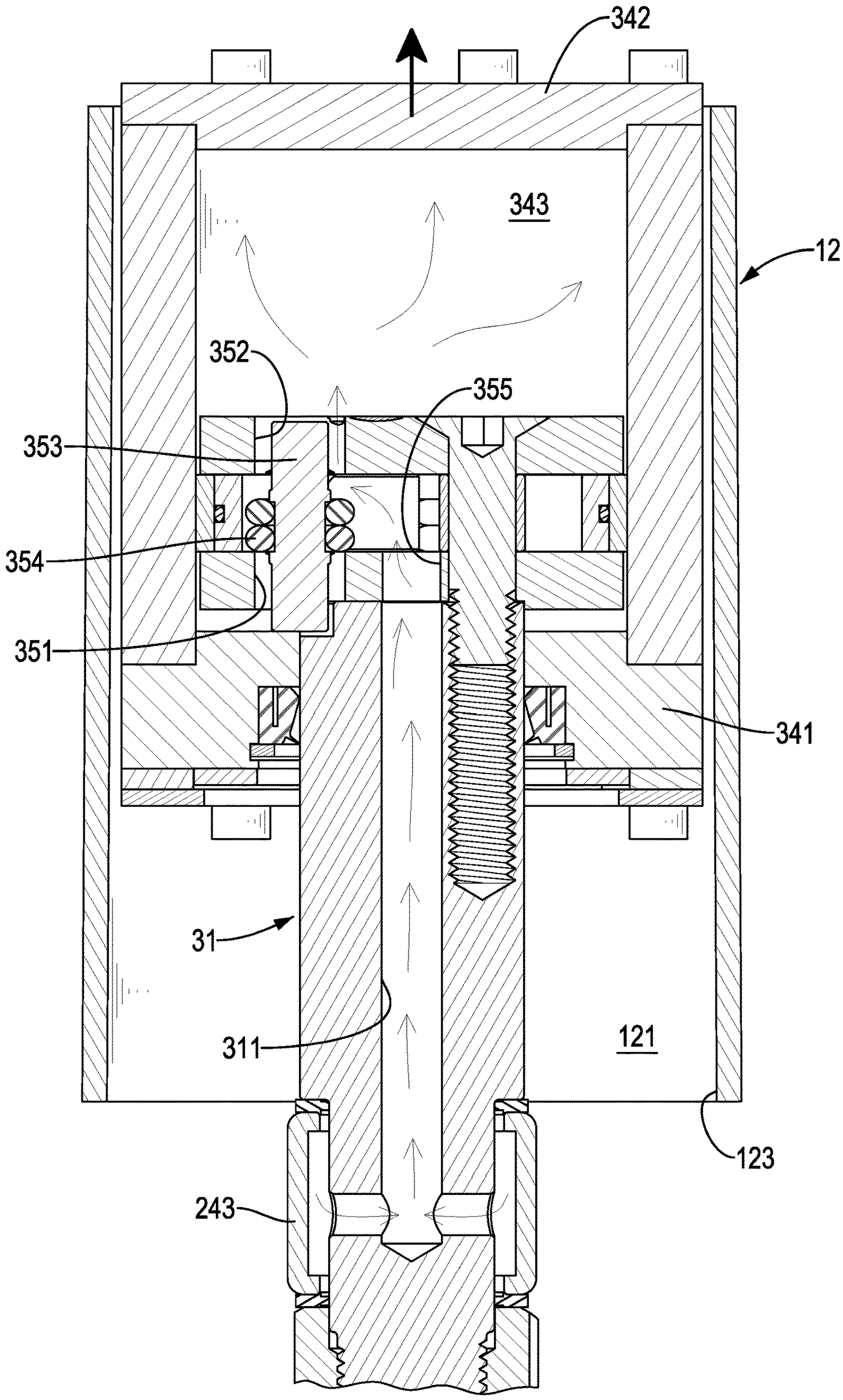
Figure 9:
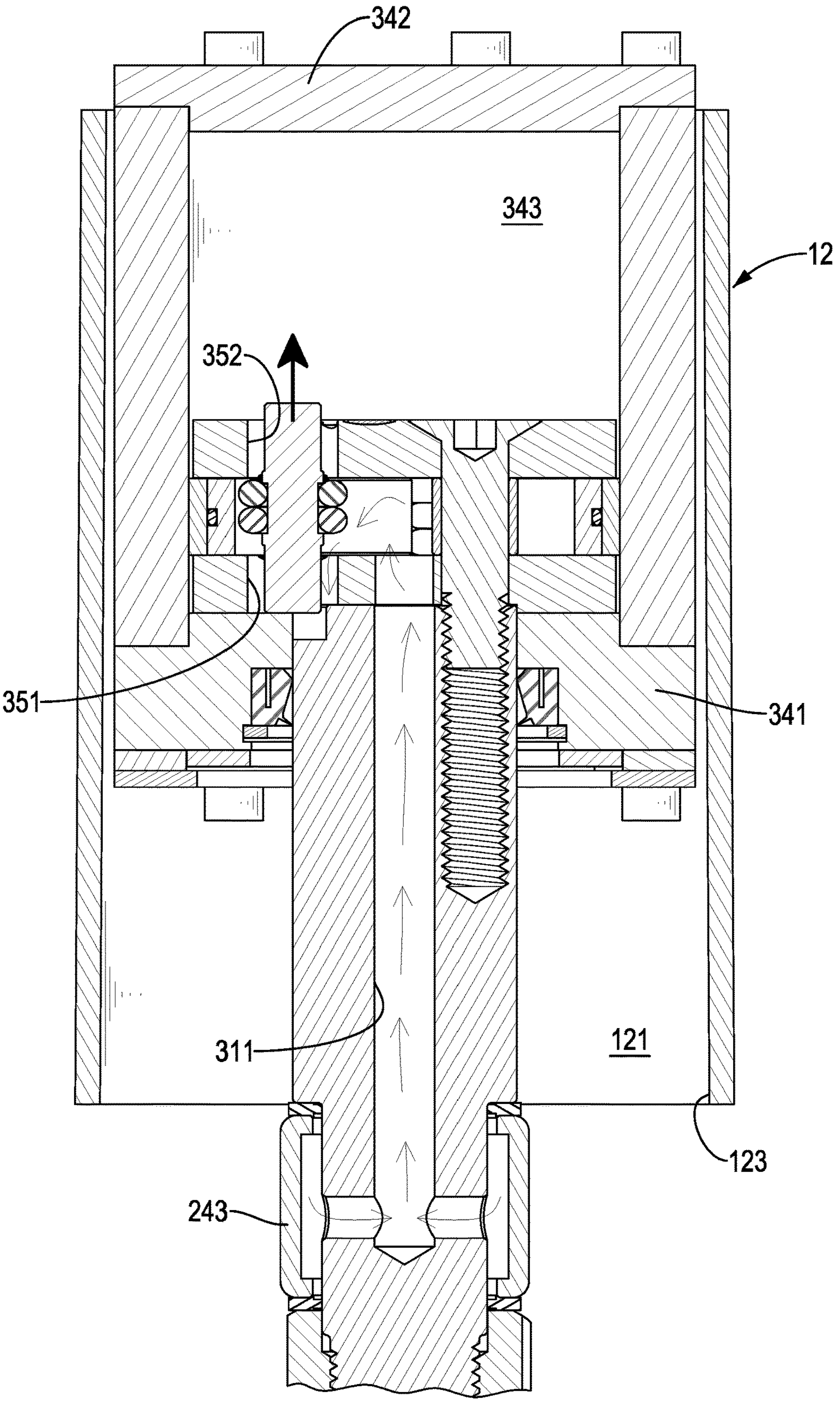
Figure 10:
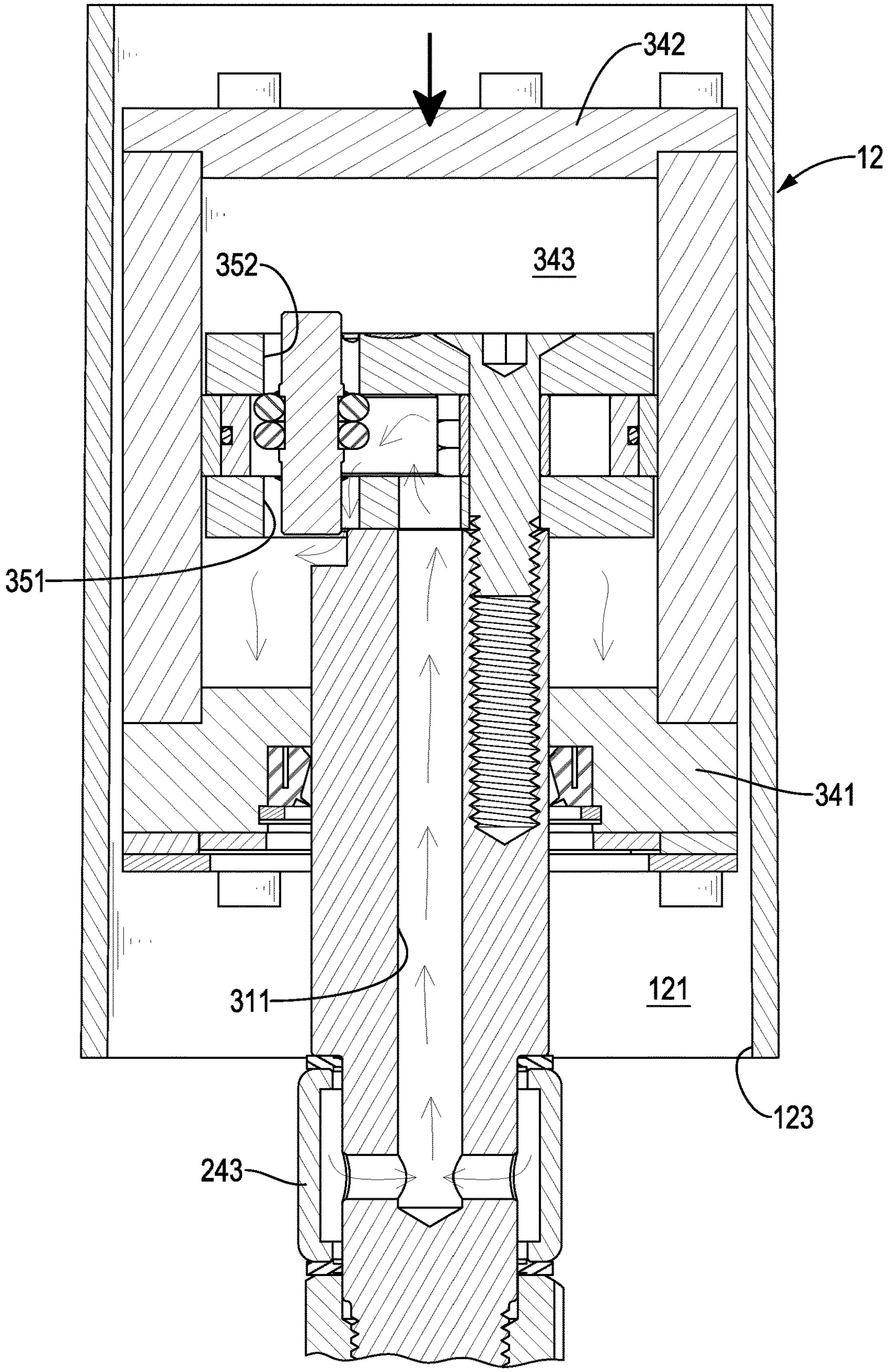
Figure 11:
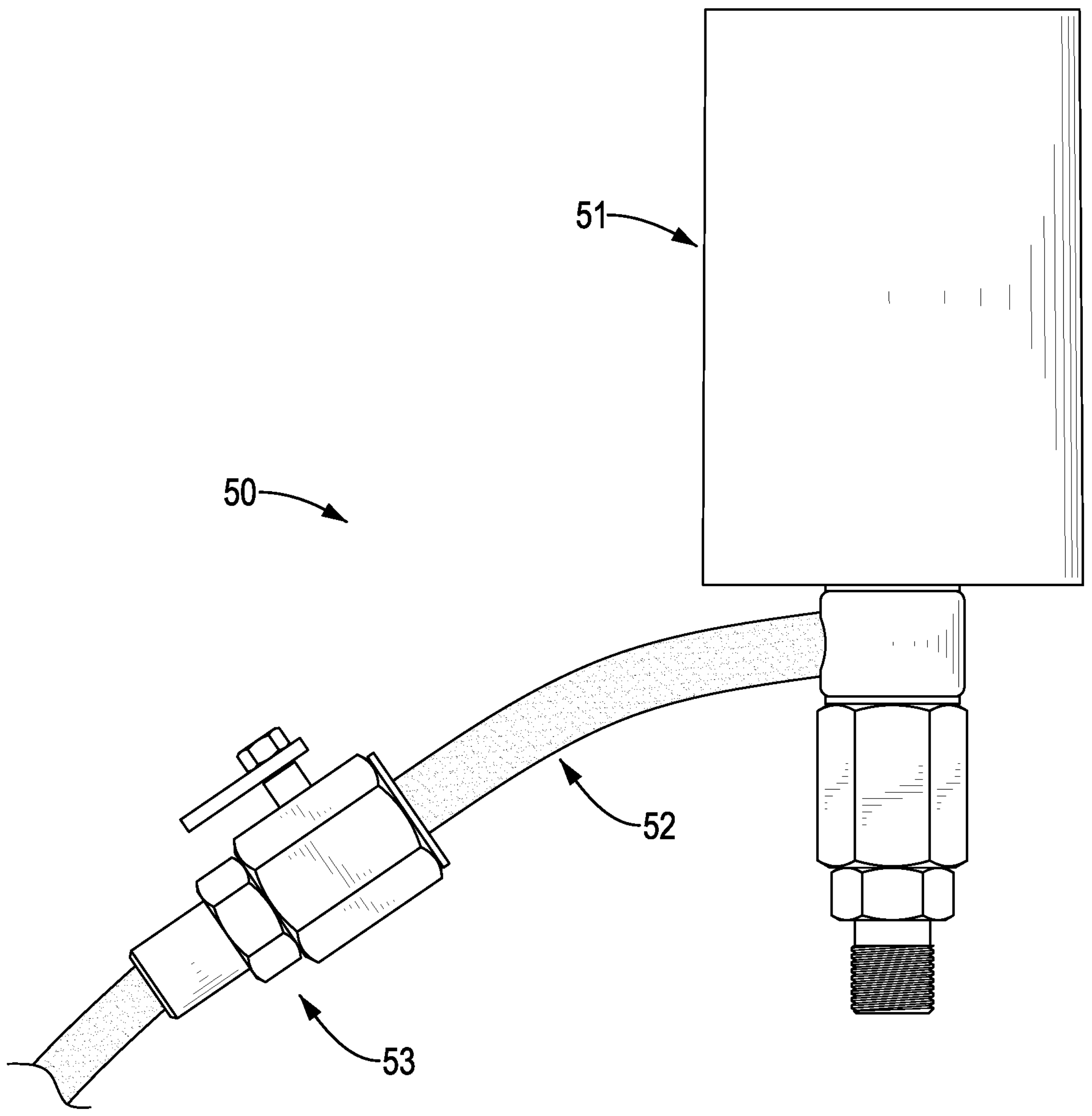
FIG. 11 PRIOR ART
FIG. 11 is a perspective side view of a pneumatic extraction device in accordance with the prior art.

With reference to FIG. 7, when the pneumatic extraction device of the present invention is in use, an air compressor is connected to the air inlet 111 of the handle 11 and a fuel injection of a diesel engine is securely connected to the fixing head 33. When a user holds the handle 11 and presses the trigger 22, compressed air in the air compressor flows into the air passage 311 of the main shaft 31 via the air inlet 111, the mounting recess 112, the air outlet 113, the first mounting ring 242, the vent pipe 241, and the second mounting ring 243. Then the compressed air in the air passage 311 of the main shaft 31 flows into the ventilating seat 35 via the communicating hole 355. At this time, the washer 354 of each toggle lever 353 shields the corresponding lower through hole 351, and the compressed air flows between the ventilating seat 35 and the top cover 342 of the outer jacket 34 via the upper through holes 352. With reference to FIG. 8, the outer jacket 34 is moved upwardly relative to the outer shell 12 along the main shaft 31 by the compressed air, and the washer 354 of each toggle lever 353 shields the corresponding upper through hole 352 by the movement of the toggle lever 353. With reference to FIG. 9, the compressed air in the ventilating seat 35 flows between the ventilating seat 35 and the bottom mount 341 of the outer jacket 34. Then, with reference to FIG. 10, the outer jacket 34 is moved downwardly relative to the outer shell 12 along the main shaft 31 by the compressed air until the top cover 342 pushes the toggle levers 353 to enable the washer 354 of each toggle lever 353 to shield the corresponding lower through hole 351.

By means of the washer 354 of each toggle lever 353 shielding the corresponding lower through hole 351 or the corresponding upper through hole 352, the outer jacket 34 is repeatedly slid up and down relative to the main shaft 31, and the outer jacket 34 moved relatively to the main shaft 31 can provide a vibration force to the main shaft 31 in the process of sliding up and down, and the vibration force is transmitted to the fuel injector through the fixing head 33, so that the fuel injector can be gradually moved relative to the cylinder of the diesel engine until the fuel injector is separated from the cylinder, and the user can release the trigger 22 to complete the removal of the fuel injector.

According to the above mentioned features and structural relationships of the pneumatic extraction device of the present invention, the user only needs to connect the main shaft 31 with the fuel injector, holds the handle 11 and presses the trigger 22, and the vibration force of the vibration group 30 can be used to separate the fuel injector from the cylinder, and this is convenient in use and easy to operate. In addition, the moving direction of the vibration group 30 can be maintained by holding the handle 11 during use, and this can avoid the situation of the fuel injector separated from the cylinder and flying outwardly, effectively improving the safety of use. Furthermore, when the fuel injector is separated from the cylinder, the injector can be stabilized through the handle 11, the at least one connecting arm 114, and the outer shell 12. Therefore, the pneumatic extraction device of the present invention can directly pull out the fuel injector without manual operation, which effectively reduces the time required for pulling out the fuel injector.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pneumatic extraction device comprising:
- a holding group having
  - a handle having
    - an air inlet longitudinally formed in the handle from a top of the handle,
    - a mounting recess transversally formed in a middle portion of the handle and communicating with the air inlet,
    - an air outlet formed in a bottom of the handle and communicating with the mounting recess, and
    - at least one connecting arm transversally formed on and protruded from an external surface of the handle; and
  - an outer shell connected to an end of the at least one connecting arm opposite to the handle such that the outer shell and the handle are spaced apart from each other;
- an air intake group connected to the holding group and having
  - a valve base mounted in the mounting recess of the handle to enable the air inlet to selectively communicate with the air outlet,
  - a trigger pressingly connected to the valve base on the external surface of the handle,
  - a connecting head connected to the bottom of the handle and communicating with the air outlet, and
  - a connecting sleeve connected to the handle, the connecting sleeve being connected to and communicating with the connecting head; and
- a vibration group connected to the holding group and the air intake group and having
  - a main shaft connected to the connecting sleeve and being opposite to the handle, extended into the outer shell, and having a fixing head disposed on a bottom end of the main shaft; and
  - a vibrating cylinder slidably mounted around the main shaft, mounted in the outer shell, and having an outer external surface non-contacted with an internal surface of the outer shell;
- wherein the air inlet communicates with the air outlet via the mounting recess when the trigger is pressed.

2. The pneumatic extraction device as claimed in claim 1, wherein the connecting sleeve has
- a vent pipe; and
- two mounting rings respectively disposed on two ends of the vent pipe, one of the two mounting rings mounted around the connecting head and communicating with the connecting head, and the other one of the two mounting rings mounted around the main shaft and communicating with the main shaft.

3. The pneumatic extraction device as claimed in claim 1, wherein the vibrating cylinder has
- an outer jacket slidably mounted around the main shaft and having
  - a bottom mount disposed on a bottom of the outer jacket and slidably mounted around the main shaft;
  - a top cover disposed on a top of the outer jacket; and
  - an air chamber formed in the outer jacket between the bottom mount and the top cover; and
- a ventilating seat mounted securely on a top end of the main shaft and disposed in the air chamber between the bottom mount and the top cover to allow compressed air in the main shaft to flow between the ventilating seat and the top cover and between the ventilating seat and the bottom mount to enable the outer jacket to move relative to the main shaft and the ventilating seat in the outer shell for providing a vibrating force to the main shaft.

4. The pneumatic extraction device as claimed in claim 2, wherein the vibrating cylinder has
- an outer jacket slidably mounted around the main shaft and having
  - a bottom mount disposed on a bottom of the outer jacket and slidably mounted around the main shaft;
  - a top cover disposed on a top of the outer jacket; and
  - an air chamber formed in the outer jacket between the bottom mount and the top cover; and
- a ventilating seat mounted securely on a top end of the main shaft and disposed in the air chamber between the bottom mount and the top cover to allow compressed air in the main shaft to flow between the ventilating seat and the top cover and between the ventilating seat and the bottom mount to enable the outer jacket to move relative to the main shaft and the ventilating seat in the outer shell for providing a vibrating force to the main shaft.

5. The pneumatic extraction device as claimed in claim 3, wherein the ventilating seat has multiple lower through holes formed through a bottom of the ventilating seat at spaced intervals and surrounding the main shaft;

multiple upper through holes formed through a top of the ventilating seat at spaced intervals, respectively aligning with the lower through holes, and communicating with the air chamber of the outer jacket;

multiple toggle levers movably disposed in the ventilating seat, each one of the toggle levers mounted in one of the lower through holes and a corresponding one of the upper through holes, and each toggle lever having at least one washer mounted around the toggle lever and selectively shielding the corresponding lower through hole and the corresponding upper through hole; and a communicating hole formed through the bottom of the ventilating seat and communicating with the main shaft.

6. The pneumatic extraction device as claimed in claim 4, wherein the ventilating seat has multiple lower through holes formed through a bottom of the ventilating seat at spaced intervals and surrounding the main shaft;

multiple upper through holes formed through a top of the ventilating seat at spaced intervals, respectively aligning with the lower through holes, and communicating with the air chamber of the outer jacket;

multiple toggle levers movably disposed in the ventilating seat, each one of the toggle levers mounted in one of the lower through holes and a corresponding one of the upper through holes, and each toggle lever having at least one washer mounted around the toggle lever and selectively shielding the corresponding lower through hole and the corresponding upper through hole; and a communicating hole formed through the bottom of the ventilating seat and communicating with the main shaft.

7. The pneumatic extraction device as claimed in claim 1, wherein the handle, the at least one connecting arm, and the outer shell are formed as a single piece.

8. The pneumatic extraction device as claimed in claim 2, wherein the handle, the at least one connecting arm, and the outer shell are formed as a single piece.

9. The pneumatic extraction device as claimed in claim 3, wherein the handle, the at least one connecting arm, and the outer shell are formed as a single piece.

10. The pneumatic extraction device as claimed in claim 4, wherein the handle, the at least one connecting arm, and the outer shell are formed as a single piece.

11. The pneumatic extraction device as claimed in claim 5, wherein the handle, the at least one connecting arm, and the outer shell are formed as a single piece.

12. The pneumatic extraction device as claimed in claim 6, wherein the handle, the at least one connecting arm, and the outer shell are formed as a single piece.

* * * * *